(12) United States Patent
Reece et al.

(10) Patent No.: US 7,206,600 B2
(45) Date of Patent: Apr. 17, 2007

(54) METHOD AND APPARATUS OF ANTENNA DETECTION AND AUTHENTICATION

(75) Inventors: John K. Reece, Colorado Springs, CO (US); Doug D. Scott, Colorado Springs, CO (US); Timothy L. Reese, Colorado Springs, CO (US); Brian L. Fox, Colorado Springs, CO (US)

(73) Assignee: Intel Corporation, Santa Clara, CA (US)

( * ) Notice: Subject to any disclaimer, the term of this patent is extended or adjusted under 35 U.S.C. 154(b) by 460 days.

(21) Appl. No.: 10/328,181

(22) Filed: Dec. 26, 2002

(65) Prior Publication Data

US 2004/0127247 A1 Jul. 1, 2004

(51) Int. Cl.
*H04M 1/00* (2006.01)

(52) U.S. Cl. ............... 455/550.1; 455/13.3; 455/78; 455/88; 455/121; 455/127.1; 455/128; 455/129; 455/352; 455/411; 455/558; 455/562.1; 455/571; 455/575.7; 379/447; 379/433.05; 380/44; 380/46

(58) Field of Classification Search ............. 455/550.1, 455/13.3, 83, 562.1, 575.7, 121, 122, 123, 455/129, 13, 3, 127.5, 127.1, 127.2, 128, 455/352, 410, 411, 101, 1, 78, 558, 571, 88; 379/447, 433.05; 380/44, 46
See application file for complete search history.

(56) References Cited

U.S. PATENT DOCUMENTS

| 5,715,522 | A | * | 2/1998 | Vimpari et al. | ............... 455/88 |
| 6,105,006 | A | * | 8/2000 | Davis et al. | ............... 705/35 |
| 6,378,073 | B1 | * | 4/2002 | Davis et al. | ............... 726/1 |
| 6,721,556 | B2 | * | 4/2004 | Tezuka et al. | ............. 455/411 |
| 6,760,579 | B1 | * | 7/2004 | Yokoyama et al. | ......... 455/352 |
| 6,879,689 | B2 | * | 4/2005 | Carroll et al. | ............... 380/44 |
| 2004/0053582 | A1 | * | 3/2004 | Nakanishi et al. | .......... 455/101 |

\* cited by examiner

*Primary Examiner*—Matthew D. Anderson
*Assistant Examiner*—Shaima Q. Aminzay
(74) *Attorney, Agent, or Firm*—Pearl Cohen Zedek Latzer, LLP (57) ABSTRACT

Briefly, a method and apparatus for decoding and authenticating an antenna is disclosed. The method may include detecting attachment of an antenna to a transmitter by authenticating a cipher received from the antenna. The method further includes suspending transmission if the antenna is not attached to the transmitter.

22 Claims, 10 Drawing Sheets

FIGURE 10

METHOD AND APPARATUS OF ANTENNA DETECTION AND AUTHENTICATION

BACKGROUND OF THE INVENTION

One of the more challenging design constraints placed on radio frequency (RF) engineers is the effective isotropically radiated power (EIRP) specification to which wireless transmission systems may conform. Existing methods and systems for complying with EIRP regulations are problematic. In the industrial, scientific, and medical (ISM) frequency band, for instance, the Federal Communications Commission (FCC) requires that a non-standard RF connector be used at the antenna port to ensure that a wireless device is not attached to an antenna that would cause the device to exceed applicable EIRP limits.

However, as a non-standard connector is put to common use in a family of devices, it eventually may lose its status as being "non-standard" over time. This may make the notion of what is non-standard difficult to determine and follow, especially because the FCC from time to time issues updated guidelines changing the status of certain non-standard connectors to standard.

Furthermore, for the personal communication service (PCS) band, no such formal requirement has been developed. Hence, a PCS wireless device user may connect an unauthorized antenna to the device and may cause an EIRP violation. In addition to EIRP compliance issues, permanent damage to a wireless device's internal components may result from prolonged operation with an unauthorized (i.e., mismatched) antenna.

A device may sustain as much damage when operated without an antenna as it might with a faulty antenna having an electrical short. A voltage standing wave ratio (VSWR) protection circuit may be deployed for circuit protection. In any of the above cases, early detection and prevention are needed to protect the device's power amplifier (PA) and other circuit elements from damage.

DETAILED DESCRIPTION OF THE INVENTION

In the following detailed description, numerous specific details are set forth in order to provide a thorough understanding of the invention. However, it will be understood by those of ordinary skill in the art that the present invention may be practiced without these specific details. In other instances, well-known methods, procedures, components and circuits may not have been described in detail so as not to obscure the present invention.

Some portions of the detailed description, which follow, are presented in terms of algorithms and symbolic representations of operations on data bits or binary digital signals within a computer memory. These algorithmic descriptions and representations may be the techniques used by those skilled in the data processing arts to convey the substance of their work to others skilled in the art.

Unless specifically stated otherwise, as apparent from the following discussions, it is appreciated that throughout the specification discussions the term "plurality" may refer to two or more components, devices, elements, parameters and the like. For example, "plurality of keys" describes two or more keys.

It should be understood that the present invention may be used in a variety of applications. Although the present invention is not limited in this respect, the circuits and techniques disclosed herein may be used in many apparatuses such as transmitters of a radio system. Transmitters intended to be included within the scope of the present invention include, by way of example only, wireless local area network (WLAN) transmitters, two-way radio transmitters, digital system transmitters, analog system transmitters, cellular radiotelephone transmitters and the like.

Figure 1:
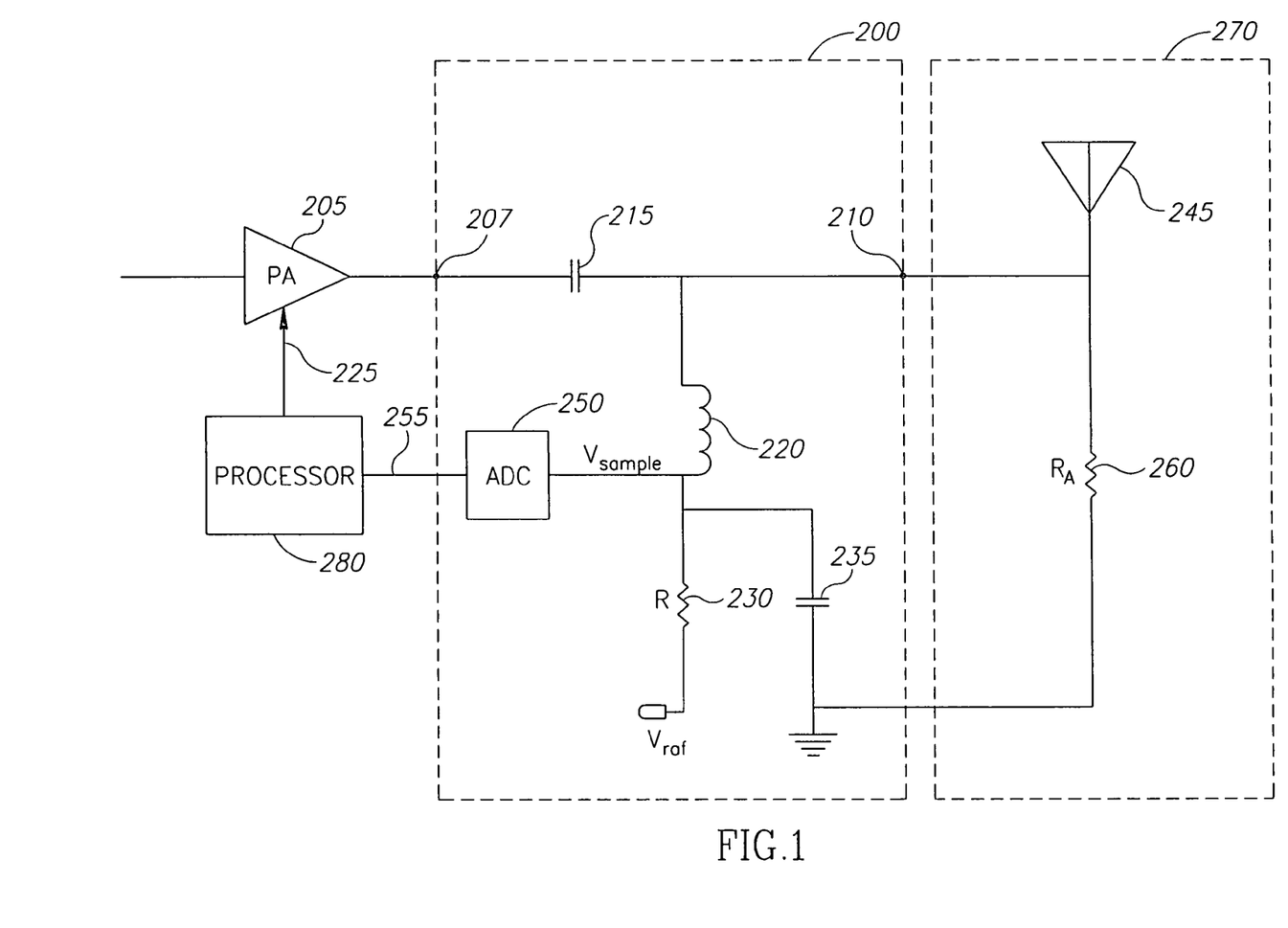
FIG. 1 is a schematic diagram of an antenna detection circuit constructed in accordance with one exemplary embodiment of the present invention.

Turning first to FIG. 1, a schematic diagram of an exemplary antenna detection circuit 200 for detecting an antenna characteristic, such as, for example, antenna gain value, and radiated power value, according to one embodiment of the invention is shown. Although the scope of the present invention is not limited in this respect, antenna detection circuit 200 comprises an input port 207, an output port 210, a reference voltage $V_{ref}$, an analog-to-digital converter (ADC) 250, and other circuit elements that maintain direct current (DC) conditions as described below.

In some embodiments of the invention, input port 207 may be located between the output of a power amplifier (PA) 205 and output port 210. A DC blocking capacitor 215 may be connected between input port 207 and output port 210. An inductor 220 may be connected between output port 210 and ADC 250. Inductor 220 and capacitor 215 may create and maintain the appropriate DC operating conditions by protecting the ADC 250 from the transmitted RF energy and by preventing DC leakage current from damaging PA 205, respectively. Thus, an RF signal may pass through antenna detection circuit 200 unimpeded by capacitor 215 and AC current may be blocked by choke 220, thus, preventing it from affecting the DC operation of the voltage sampling process described below.

Output port 210 may be coupled to antenna 270, which may have an antenna resistance 260. Resistor 230 may couple reference voltage input $V_{ref}$ to ADC 250. The reference voltage $V_{ref}$ may be a fixed, stable voltage that may be supplied, for example, by a regulated power supply (not shown) that may be used elsewhere in the device. ADC 250 may be coupled to a baseband processor 280 for processing the digital output of ADC 250 and adjusting conducted power along control line 225. Finally, shunt capacitor 235 may be connected between a ground potential and ADC 250 to remove parasitic RF energy from the DC network, if desired.

Although the scope of the present invention is not limited in this respect, antenna detection circuit 200 may act as a resistive voltage divider network under DC conditions. The reference voltage $V_{ref}$ may be divided between resistors 230 and 260, and may be sampled by ADC 250. Furthermore, $V_{sample}$ may be a function of an encoded antenna resistance $R_A$ according to:

$$V_{sample} = \frac{R_A}{R_A + R} V_{ref}.$$

The antenna resistance $R_A$ may include a predetermined resistance value that may be encoded and provided by the antenna manufacturer. For example, antenna 270 may be an antenna with a high antenna resistance $R_A$ at the resonant frequency.

Although the scope of the present invention is not limited in this respect, antenna resistance $R_A$ may represent the DC resistance of antenna 270. In addition, resistance value of $R_A$ for a given antenna may be selected to be large resistance value relative to the antenna's radiation resistance. Furthermore, antenna resistance value, $R_A$, may be a discrete circuit element of resistance, such as, for example, a resistor, a combination of resistive circuit elements including a combination of resistors, and the like.

Although the scope of the present invention is not limited in this respect, in some embodiment, by varying and measuring different values of antenna resistance $R_A$, antenna detection circuit 200 may be calibrated to recognize certain encoded characteristics of antenna 270 to which antenna detection circuit 200 is attached. In some embodiments of the present invention, an indicator 255 may be provided to processor 280 to detect attachment of antenna 270 and/or to control a conducted power of the transmitter by authenticating indicator 255.

Although the scope of the present invention is not limited in this respect, indicator 255 may be generated based on antenna characteristic. Processor 280 may suspend power conduction from PA 205 when no valid indicator is received from antenna 270, e.g., when a lack of the valid indicator indicates a fault condition and/or an unattached antenna.

Although the scope of the present invention is not limited in this respect, indicator 255 may a digital word, an analog signal, a cipher, a key, a serial number of the antenna, and the like. Embodiments of the present invention with exemplary types of indicators will be described below, although the scope of the present invention is in no way limited to any or all of those embodiments.

In some embodiments of the present invention, encoding of antenna characteristics may result in multiple different sampled voltage values, $V_{sample}$, measured at the input to ADC 250. Decoding of the encoded antenna characteristics may take place in the digital realm after ADC 250 converts $V_{sample}$ into a digital equivalent. For example, the digital output of ADC 250 may be read by processor 280 to determine the measured voltage level and may be compared to a list of stored voltage values that are correlated with a predetermined value of an antenna gain and/or open circuit value and/or short circuit value.

As an example, for a given value of an observed resistance $R_A' \gg R_A$, wherein $R_A'$ may be the actual value of $R_A$ that corresponds to the gain of the antenna, the sampled voltage $V_{sample}$, at the input to ADC 250 may be recognizably distinguishable from $V_{sample}$ as measured with an antenna having antenna resistance $R^A$. If, on the other hand, the value of $R_A'$ is close in value to $R_A$, then the antenna characteristic (e.g., gain in this example) may not be determinable. With a high resolution at the input to ADC 250, a range of determinable voltage values may enable the recognition of a number of antennas, limited by the tolerance and quantization levels of ADC 250.

Figure 2:
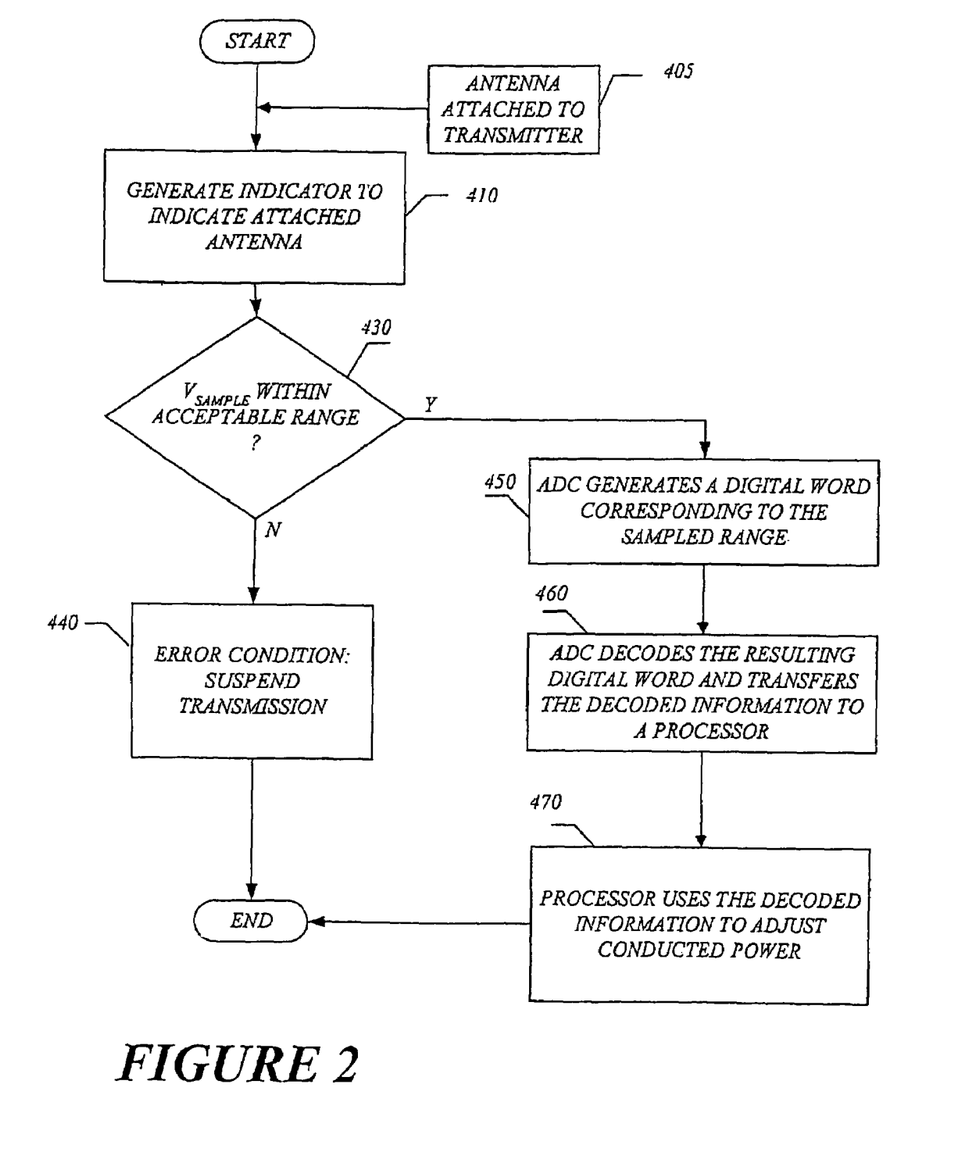
FIG. 2 is a flow chart of a method according to an exemplary embodiment of the invention.

Turning to FIG. 2, a flow chart of a method of detecting an antenna gain according to an exemplary embodiment of the invention is shown. In some embodiments, the process may begin when antenna 270 is attached to a transmitter equipped with antenna detection circuit 200 (block 405). For example, antenna 270 may be a dipole antenna, a quad-band vertical dipole antenna, a log periodic antenna, a helix spiral antenna, an array of antenna elements and the like.

Although the scope of the present invention is not limited in this respect, an indicator to indicate some characteristics of antenna 270 may be generated by ADC 250. For example, ADC 250 may sample a voltage, $V_{sample}$, derivable from the DC-equivalent voltage divider network comprising R and $R_A$ (block 410). In decision block 430, antenna detection circuit 200 may determine if $V_{sample}$ is within an acceptable range to enable decoding of the encoded characteristic of antenna 270. Although the scope of the present invention is not limited in this respect, an acceptable range in this context may be a function of the tolerance levels built into antenna detection circuit 200, including the quantization capabilities of ADC 250.

There may be various possible causes of an unacceptable range of $V_{sample}$. For example, the antenna 270 may be absent, in which case, the voltage sample value $V_{sample}$ will be at or near reference voltage $V_{ref}$ (i.e., an open circuit condition). As another example, the antenna 270 may be unauthorized, in which case it may have resistance value $R_A$ that interferes with calibration of a determinable sample voltage at the input of ADC 250; in other words, an antenna for which DC resistance $R_A$ produces a sample voltage $V_{sample}$ outside of the range of acceptable (i.e., calibrated) values for ADC 250. In most cases, the resistance value $R_A$ of an unauthorized antenna will be representative of an open or short circuit at or near the reference voltage $V_{ref}$ or ground. As still another example, a short circuit condition caused by, e.g., a poor connection or faulty cable at output port 210 during antenna attachment, as indicated at action block 405, may cause the $V_{sample}$ to be at or near ground.

Regardless of the source or cause of the out of range condition, either short or open circuit or unauthorized antenna, irreparable physical harm may result to PA 205 and other system components or unauthorized EIRP may be transmitted, if no action is taken to remedy the fault. Thus, in this case, an error condition may be generated and transmission may be suspended if it is determined that $V_{sample}$ is outside of the acceptable range (block 440). For example, antenna detection circuit 200 may signal the presence of an error condition to baseband processor 280, which in turn may shut down PA 205 and notify the user of the error through the device's user interface.

Although the scope of the present invention is not limited in this respect, if $V_{sample}$ is within an acceptable range, then ADC 250 may generate a digital word corresponding to the measured sample voltage $V_{sample}$ (block 450). For example, for an 8-bit ADC, the digital word may take the form of a byte code from which ADC 250 addresses a lookup table to find and resolve the value of $V_{sample}$ with a known antenna characteristic, for example, the antenna gain. The resulting digital word may be transferred to baseband processor 280 (block 460), followed by an adjustment of the conducted power of PA 205 based on the represented antenna gain (block 470).

Although the scope of the present invention is in no way limited in this respect, the adjustment of conducted power may be used in some embodiments of the present invention to ensure compliance with regulations for human exposure to RF electromagnetic field radiation action, if desired.

Figure 3:
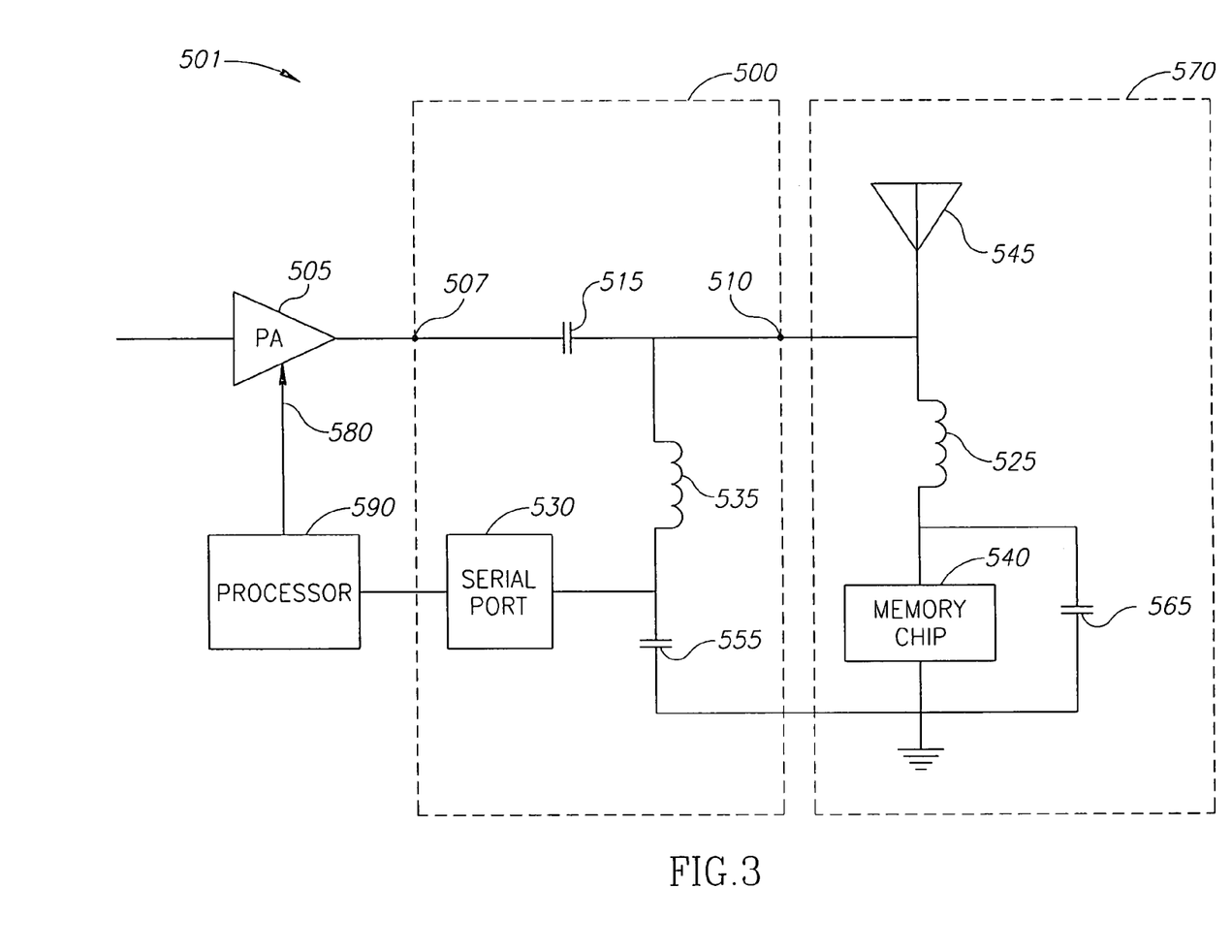
FIG. 3 is a schematic diagram of an antenna detection circuit constructed in accordance with another exemplary embodiment of the present invention.

Turning to FIG. 3, a schematic diagram of a portion of a transmitter 501 according to another exemplary embodiment of the present invention is shown. Although the scope of the present invention is not limited in this respect, transmitter 501 may include an antenna detection circuit 500 comprising an input port 507, an output port 510, a serial port 530, and other inductive and capacitive components whose function will be described below. Furthermore, transmitter 501 may include an antenna circuit 570 comprising a memory chip 540 and an antenna element 545.

Although the scope of the present invention is not limited in this respect, input port 507 may be configured to receive an RF signal from a PA 505. In this example, PA 505 may be connected to output port 510 via a DC blocking capacitor 515. Output port 510 may be coupled to a memory chip 540 of antenna circuitry 570 via RF choke 525. The memory chip 540 may store a gain code indicative of the gain of the antenna element 545. In addition, output port 510 may be operably coupled to serial port 530 via RF choke 535. Capacitors 555 and 565 may be use to maintain DC conditions. Thus, an RF signal may pass through antenna detection circuit 500 unimpeded by capacitor 515 and AC current may be blocked by choke 535 and choke 525 preventing it from affecting the DC operation of the interrogation process described below.

Although the scope of the present invention is not limited in this respect, serial port 530 may be adapted for connection with a processor-generic serial port, which may be available as a component on many of the processors to which antenna detection circuit 500 may be connected. In the illustrated embodiment of FIG. 3, the antenna detection circuit 500 may be connected to a baseband processor 590 of a transmitter, and processor 590 may interface with PA 505 along a control line 580.

In this embodiment, serial port 530 may be configured for synchronous single wire operation such that, for example, power and signal cooperate along one lead. To further facilitate communication between serial port 530 and processor 590, a serial port driver may be configured and enabled by processor 590. Additional modifications to the processor code of processor 590 may be performed to effectuate data exchange to and from memory chip 540, for example, processor 590 may fetch, store, acknowledge, and process gain codes from memory chip 540, if desired. In addition, memory chip 540 may be pre-loaded with a gain code corresponding to the gain of antenna circuitry 570. For example, the gain code may be an eight-bit factory-assigned code, such as, for example, 10101110, from which processor 590 may resolve the gain of antenna circuitry 570.

In the illustrated embodiment of FIG. 3, memory chip 540 may be implemented as a memory device, such as, for example, an electrically erasable programmable read-only memory (EEPROM), random-access memory (RAM), read-only (ROM) device, flash memory which stores a gain code corresponding to the gain of antenna circuitry 570 and may operate with DC power tapped from a serial data stream. The antenna gain codes may, e.g., be transferred in bit-sequential fashion along a single wire between memory chip 540 and processor 590. Likewise, interrogation of memory chip 540 by processor 590 may occur bit-wise sequentially over the same or similar wire in half-duplex with the gain code transfers. To accomplish bit-sequential, half-duplex transfers of this type, an EEPROM chip, such as, for example, a Dallas Semiconductor DS2430A chip, may be deployed. The DS2430A chip may be capable of the single wire pair configuration described above. However, other suitable memory packages having the ability to store digital gain code information may be used.

Figure 4:
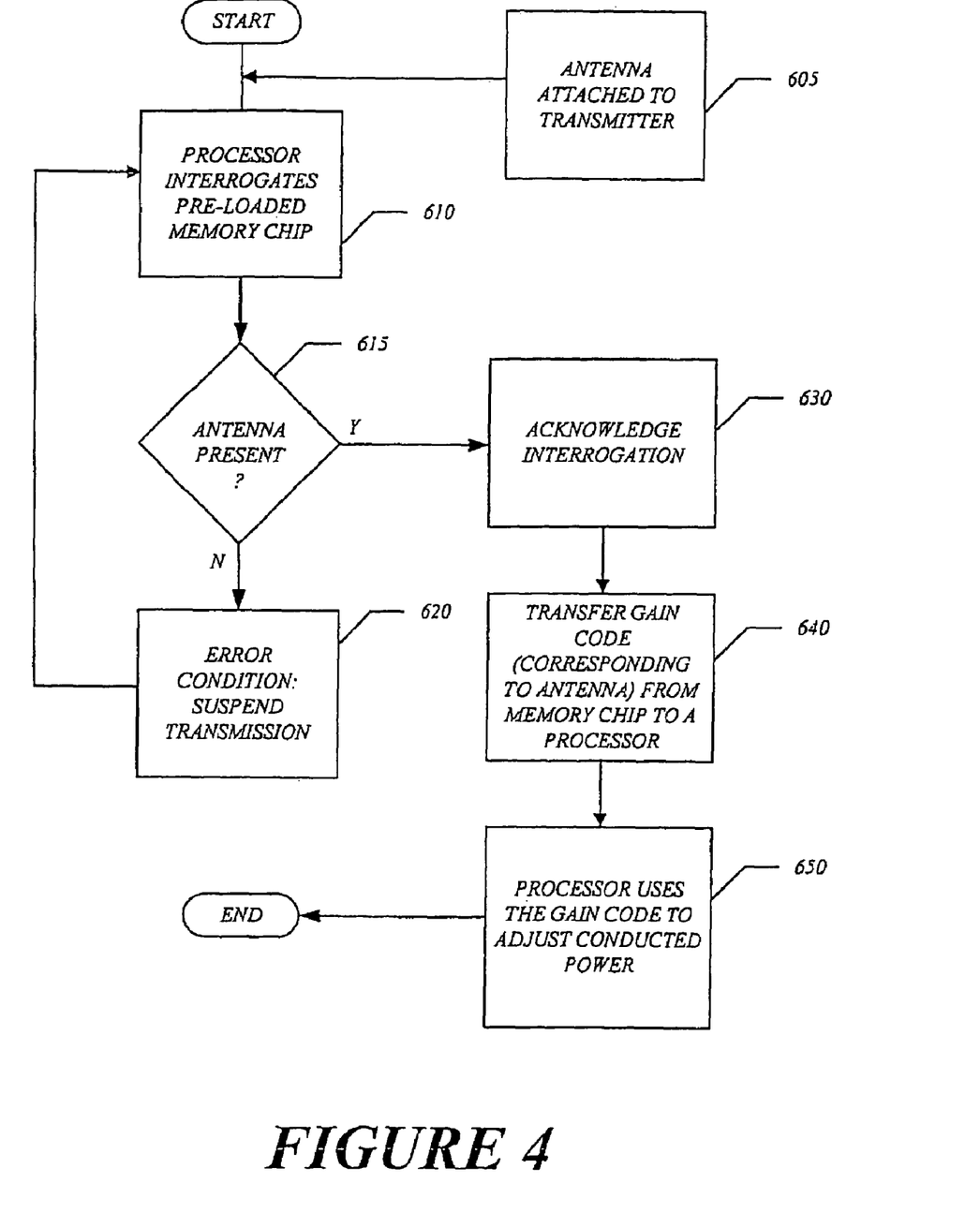
FIG. 4 is a schematic flow chart of a method to detect an antenna according to an exemplary embodiment of the invention.

Turning to FIG. 4, a flow chart of a method to detect an antenna according to an exemplary embodiment of the invention is shown. The method may begin when an antenna is attached to transmitter 501 (block 605), and before conducted power may be permitted to pass. Baseband processor 590 may interrogate memory chip 540. For example, in the process of interrogation, baseband processor 590 may learn the presence and characteristics of antenna circuitry 570. Processor 590 may initiate interrogation, e.g., according to an industry standard serial communication protocol compatible, with memory chip 540 and processor 590.

Although the scope of the present invention is not limited in this respect, the absence of antenna element 545 in decision block 615 may be indicated by a lack of valid response from the antenna memory chip within a predefined time of interrogation. If no antenna is present, PA 505 may be suspended (block 620) until the interrogation of pre-loaded memory chip 540 by processor 590 may indicate absence of the error condition (block 610). The interrogation may be acknowledged by memory chip 540 (block 630), followed by a transfer of the gain code from memory chip 540 to baseband processor 590 via serial port 530 (block 640). Finally, as indicated at action block 650, baseband processor 590 may use the gain code to adjust the conducted power of PA 505 to predetermined values, if desired.

Figure 5:
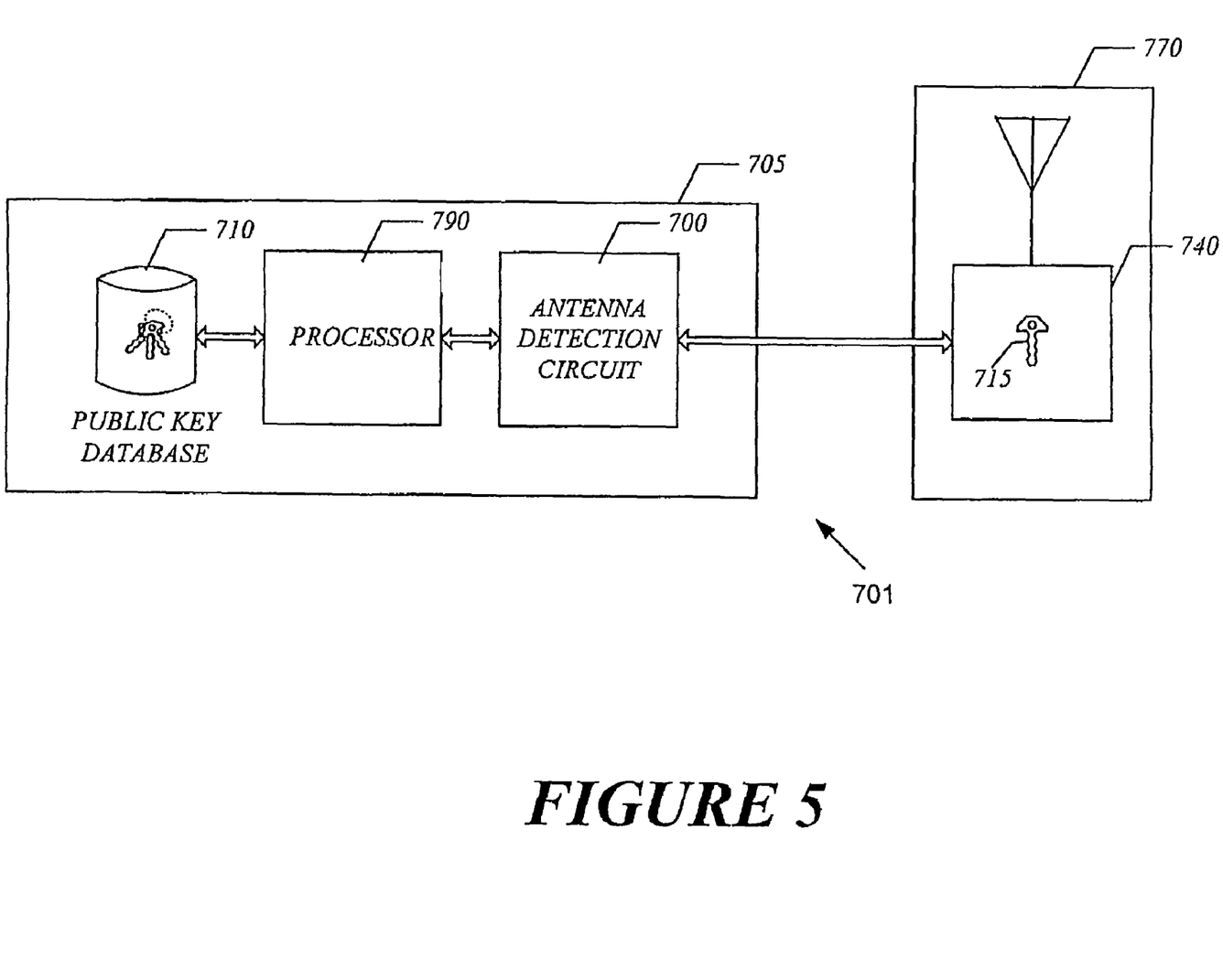
FIG. 5 is a schematic diagram of an internal asymmetrical antenna authentication system constructed in accordance with exemplary embodiments of the present invention.

Turning to FIG. 5, a schematic diagram of an internal asymmetrical antenna authentication system constructed in accordance with exemplary embodiments of the present invention is shown. Although the scope of the present invention is not limited in this respect, a wireless device 701 may comprise a transmitter 705 and an antenna circuitry 770. Transmitter 705 may include an antenna detection circuit 700, a processor 790, a public key database 710, and possibly other components, such as a PA (not shown). Antenna detection circuit 700 may be configured to interrogate and pass gain code information to and from processor 790 and antenna circuitry 770, as explained above with reference to FIG. 3. Processor 790 may be a baseband processor of transmitter 705, or other processing circuitry, such as a co-processor capable of being programmed with instructions for executing the secure authentication methods and further capable of accessing a database of public keys 710 corresponding to one or more antenna private keys 715, both of which types of keys are described below.

Antenna circuitry 770 in this embodiment may include memory chip 740 for storing a code, for example, a gain code corresponding to a gain of the antenna, or a serial number of antenna circuitry 770, and may further include private key 715 for encrypting such a code. Antenna circuitry 770 may be coupled to transmitter 705 and may communicate with antenna detection circuit 700.

In some embodiments of the invention, the authorization code may uniquely represent the antenna circuitry 770 to which it is assigned. This may be accomplished in several ways. For example, many types of chip sets, for example, the DS2432 chip set manufactured by Dallas Semiconductors, are shipped with factory laser-marked registration numbers, which may be used to help ensure uniqueness, at least across antennas incorporating such chip sets. Another way involves factory assignment of locally unique serial numbers which, when coupled with an assigned manufacturer code, may ensure global uniqueness. In addition, a "clearing house" of authorization codes may be built, maintained, and administered, for example, the International Mobile Equipment Identifier (IMEI) specification, which helps ensure uniqueness across product lines and manufacturers in the wireless WAN industry.

Although the scope of the present invention is not limited in this respect, the database of public keys 710 may include the public key sets corresponding to a private key 715 that may indicate attachment of antenna circuitry 770 to transmitter 705. As is known to persons skilled in the art, public keys and private keys may operate in pairs. Accordingly, in exemplary embodiments of the invention, a public key may be used by transmitter 705 to decode a digitally encrypted authorization code (i.e., digital signature) that may be supplied to transmitter 705 by antenna circuitry 770. In addition, the database of public keys 710 may be periodically updated to include reference to new antenna circuitries 770 that may be introduced to the market. Additionally, the universe of public keys may be divided into gain classes, wherein transmitter 705 may need to receive, e.g., infrequent updates to public key database 710 corresponding to the device's own gain class. The manner of updating public key database 710 will depend on the specific implementation. For instance, if public key database 710 is implemented as an EEPROM, the updates may occur electronically with such frequency as gain class changes prescribe.

Figure 6:
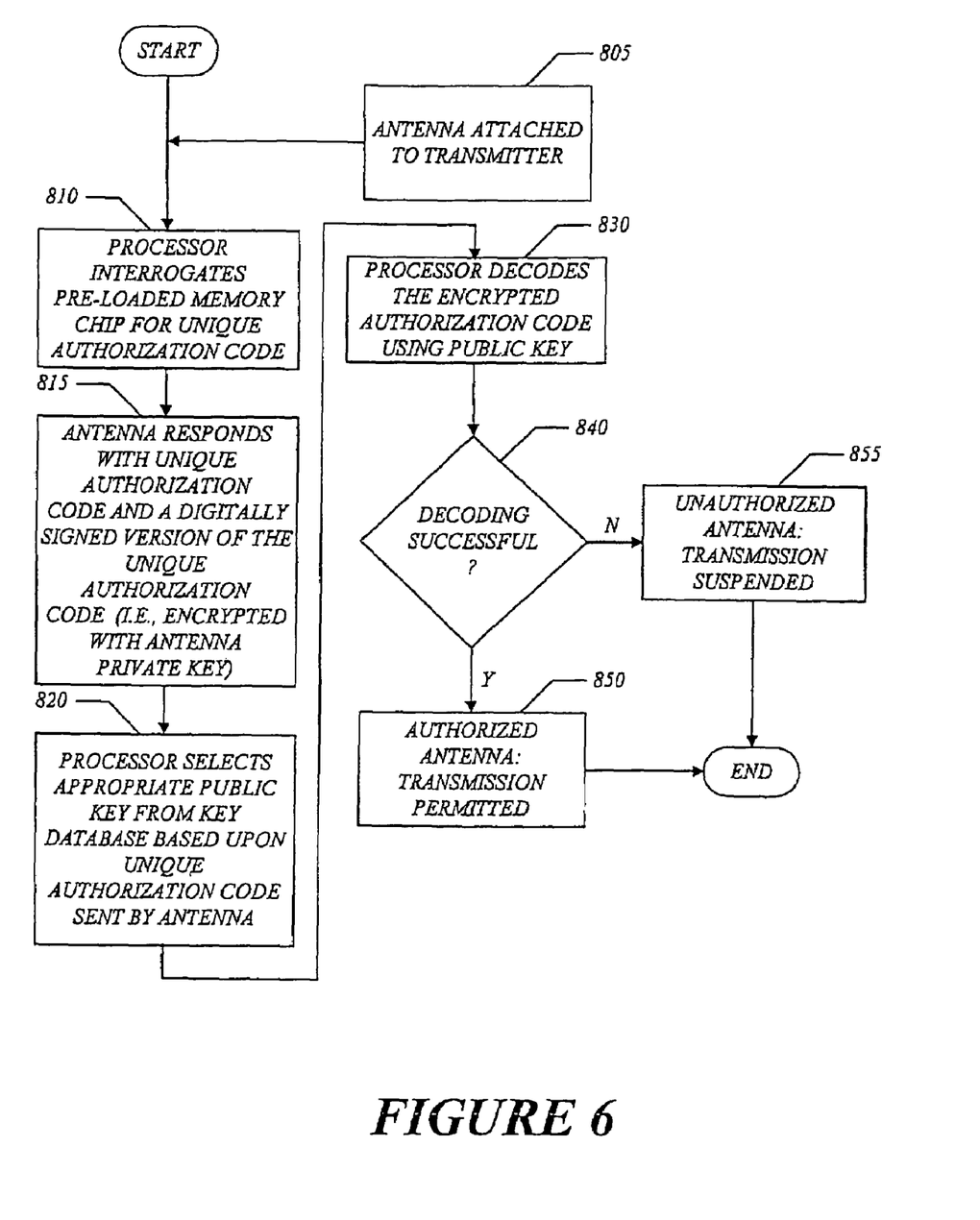
FIG. 6 is a schematic flowchart of a method of asymmetrical antenna authentication system according to exemplary embodiments of the present invention.

Turning to FIG. 6, an exemplary method of asymmetric antenna authentication used by the antenna detection circuit 700 is shown. The method may begin when antenna circuitry 770 is attached to transmitter 705 (block 805), and before conducted power is permitted to pass, at which point processor 790 may interrogate memory chip 740 for a unique authorization code, for example, an antenna serial number pre-loaded into memory chip 740 by the manufacturer (block 810). Antenna circuitry 770 may acknowledge interrogation by responding with a digital signature (i.e., private key encrypted authorization code), as indicated at block 815. Furthermore, antenna circuitry 770 may also send an unsigned version of the authorization code for the purpose of looking up the appropriate public key from public key database 710.

Although the scope of the present invention is not limited in this respect, processor 790 may select the appropriate public key from public key database 710 based upon the previously received unsigned code (block 820). Processor 790 may use the public key to decode the digital signature (block 830). In this embodiment, if decoding is successful (decision block 840), and the authentication is successful, then antenna circuitry 770 may be authorized and conducted power may be permitted to pass (block 850). If decoding is unsuccessful, the process may for example proceed to block 855, suspending transmission. However, modification of the wireless device's radiated power level may be necessary in other embodiments of the present invention. It should be noted that although an asymmetrical encryption technique has been described with respect to FIG. 6, symmetrical techniques that include complementary private keys may also be used in conjunction with embodiments of the present invention.

Alternatively, the systems and methods for secure antenna authentication may randomize the antenna authentication process so that authentication information relayed between antenna circuitry 770 and transmitter 705 may vary from one authentication attempt to the next. One randomization technique may use a random number generator of the processing circuitry (not shown), either internal or external to the wireless device, for issuing a random challenge to the antenna. Authentication may be further facilitated by a comparison of a random number hash performed at the antenna with an independently computed hash made available to the wireless device, for example, as described in the following embodiment.

Figure 7:
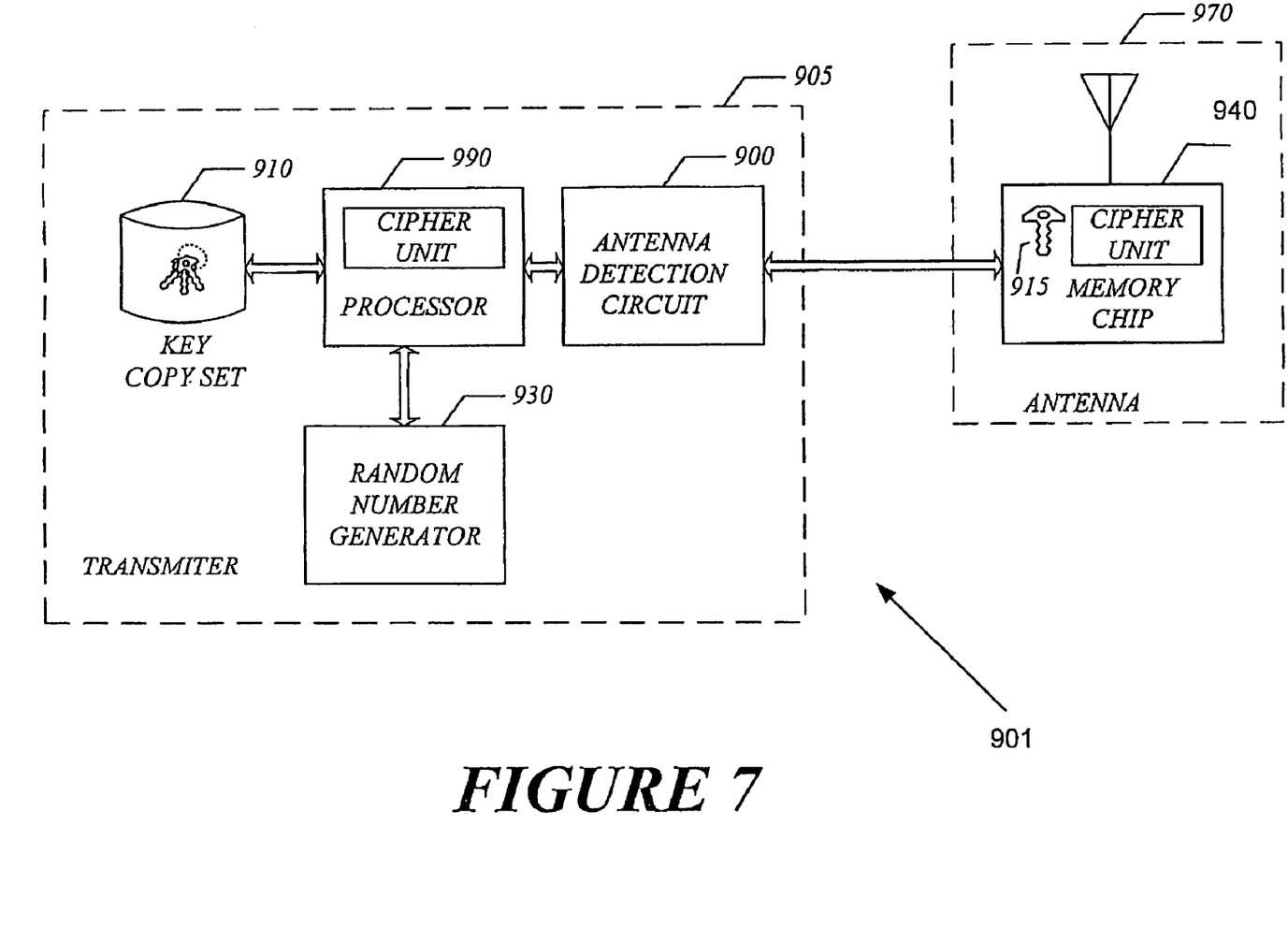
FIG. 7 is a schematic diagram of an internal antenna authentication system constructed in accordance with exemplary embodiments of the present invention.

Turning to FIG. 7, a schematic diagram of an internal antenna authentication system constructed in accordance with another embodiment of the present invention is shown. Although the scope of the present invention is not limited in this respect, a wireless device 901 may comprise a transmitter 905 and antenna circuitry 970. Transmitter 905 may include an antenna detection circuit 900, a processor 990 having a cipher unit, a random number generator 930 for generating a random challenge to be hashed by antenna circuitry 970 and processor 990, and a key copy set 910 for use by the cipher unit of processor 990 in hashing the random challenge generated by random number generator 930.

Although the scope of the present invention is in no way limited in this respect, the random challenge generated by random number generator 930, may include a number, a text word, a combination of letters and numbers or any other code words that may be encrypted by the cipher unit using the key. Antenna circuitry 970 may include a memory chip 940, which may include a cipher unit and a key 915.

Although the scope of the present invention is not limited in this respect, antenna detection circuit 900 may be configured to interrogate and pass gain code information to and from processor 990 and antenna 970, e.g., as explained with reference to FIG. 3 above. Processor 990 may be a baseband processor of transmitter 905, or other processing circuitry, for example, a co-processor capable of being programmed with instructions for executing the secure authentication methods and further capable of accessing a database of key copies 910 corresponding to one or more antenna secret keys 915, both of which types of keys are described below.

In this embodiment, the random challenge may be a simple random number or random bit sequence that processor 990 may use to challenge the identity of antenna circuitry 970, and then check for the antenna's authenticity. Random number generator 930 may be implemented in hardware or software, either internal or external to processor 990. For instance, the DS2432 chip may respond to a random challenge issued by processor 990 by computing the SHA-1 hash of the challenge with an internally stored secret (e.g., key). Random challenge generation may be accomplished by a random number generator under the control of processor 990, as shown, or externally, for example, by the processing circuitry of an external server (not shown).

Although the scope of the present invention is not limited in this respect, key copy set 910 may include the key copies corresponding to secret key 915. In addition, updates to key copy set 910 as new antennas are introduced to the market may be easily accomplished in the manner previously described in connection with the asymmetric embodiment of FIG. 5. In embodiments of the invention, memory chip 940 of antenna circuitry 970 may include a cipher unit. For instance, a cipher unit that supports the US Government-sponsored secure hashing algorithm (SHA-1) standard, such as Dallas Semiconductor's DS2432 EEPROM with built-in SHA-1 support, may be used for memory chip 940. However, other suitable memory storage devices having a cipher for hashing messages may be used. In addition, cipher functionality may be implemented separately from memory chip 940, and other hashing algorithms, for example, the MD4 and MD5 algorithms, known to the one skilled in the art, may also be used in conjunction with embodiments of the invention.

Although the scope of the present invention is not limited in this respect, the SHA-1 engine in the cipher unit of the memory chip 990 may be configured to respond to a random challenge issued by antenna detection circuit 900. The SHA-1 engine may be configured to compute the hash of the challenge using a pre-stored secret. The pre-stored secret may correspond to a key used by the SHA-1 engine to compute message authentication codes (i.e., hash values). In this embodiment, a unique secret key may be assigned from a large set of keys.

Although the scope of the present invention is not limited in this respect, in the cipher unit embodiment described above, the SHA-1 engine may be configured to associate a unique secret to a potential gain range of available antenna to which a transmitter might be attached. In addition, the serial number of antenna circuitry 970, which number may be pre-stored in memory chip 940, may be assigned to one of these gain ranges, based on the antenna's own gain. Finally, the processor 990 may be configured to access a key database 910 that is pre-equipped with a set of keys corresponding to the full line of antennas for which attachment may be anticipated. Authentication of antenna circuitry 970 may proceed according to an antenna authentication method as described below.

Figure 8:
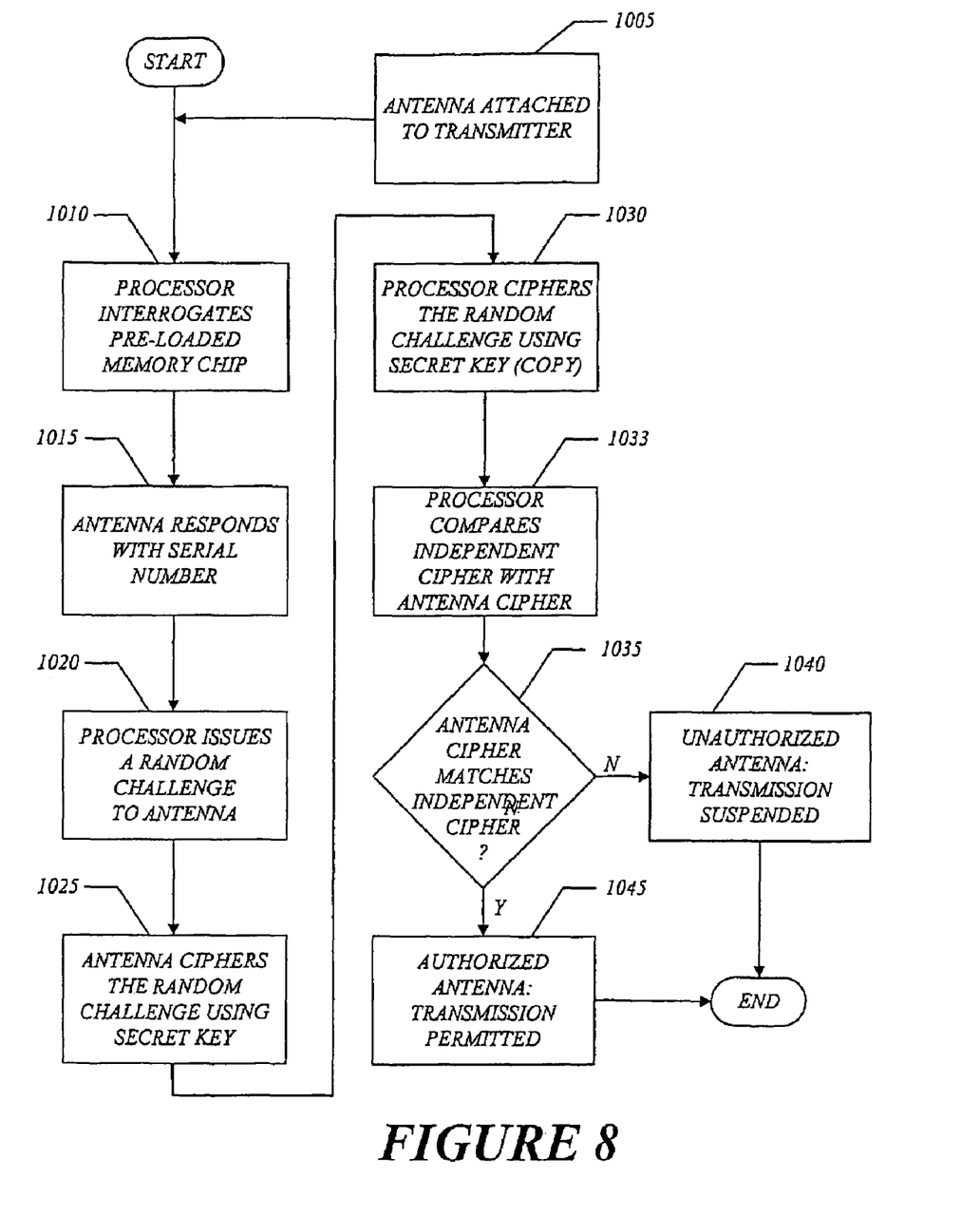
FIG. 8 is a flow chart of a method of antenna authentication according to exemplary embodiments of the present invention.

FIG. 8 is a flow chart illustrating an exemplary operation of an embodiment of the internal antenna authentication system of FIG. 7. Although the scope of the present invention is not limited in this respect, the method may begin when an antenna circuitry 970 is attached to the transmitter 905 (block 1005), and before conducted power is permitted to pass, at which point processor 990 may interrogate memory chip 940 (block 1010). As indicated at block 1015, antenna circuitry 970 may acknowledge the interrogation by transferring the antenna's serial number, which may be pre-stored in memory chip 940 back to the processor 990. AS indicated at block 1020, the random number generator 930 may issue a random challenge to processor 990, which may pass the random challenge on to antenna 970. As indicated at block 1025, antenna circuitry 970 may cipher the random challenge using the antenna's own key.

Although the scope of the present invention is not limited in this respect, the processor 990 may independently cipher the random challenge using a copy of the secret key, which processor 990 may access from key copy database 910 (block 1030). The processor 990 may estimate which key to use based on the serial number received during initial antenna interrogation (block 1015). Processor 990 may compare the independently computed cipher with the cipher computed by antenna circuitry 970 (block 1033). If the independent cipher fails to match the antenna 970 cipher (block 1035), then antenna circuitry 970 may be deemed unauthorized and transmission may be suspended (block 1040). If the processor 990 cipher matches the antenna 970 cipher, then antenna 970 may be deemed authorized (block 1045) and transmission is allowed, with the possibility of a modification of the wireless device's power level as set forth above with reference to the methods of FIGS. 2 and 3.

Although the scope of the present invention is not limited in this respect, modifications to the authentication method of FIG. 8 may include combining block 1015 and block 1025 such that antenna circuitry 970 may respond to the challenge of processor 990 by simultaneously providing both the antenna serial number and cipher.

Another alternative to the authentication method above may include access to an external database. For example, a database may be, for instance, stored on a database server attached to the Internet or other network. In this embodiment, the server may store a database of antenna serial numbers and a set of keys, each key corresponding to an antenna. The antenna may be initially used to establish connectivity with the data source on the network; however, continued use may require that the antenna be authorized according to an antenna authentication process as described below.

Figure 9:
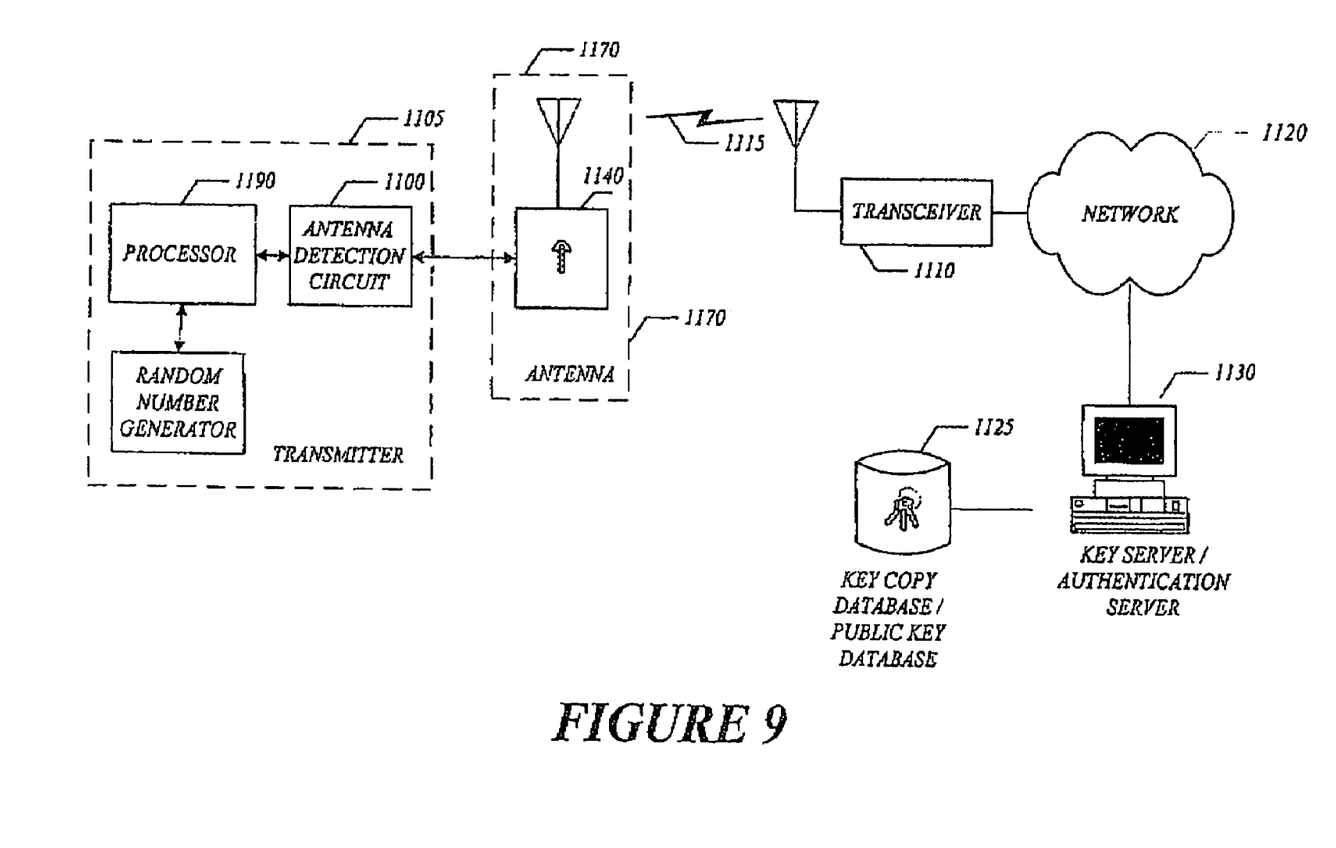
FIG. 9 is a schematic diagram of an external antenna authentication system constructed in accordance with yet another exemplary embodiment of the present invention.

FIG. 9 is a schematic diagram of an external antenna authentication system constructed in accordance with embodiments of the present invention. Although the scope of the present invention is not limited in this respect, an antenna 1170 may be coupled to a transmitter 1105 for communicating over air interface 1115 with transceiver 1110. Air interface 1115 may be implemented according to any number of wireless voice and or data standards, for example, advanced mobile phone service (AMPS), personal communication service (PCS), global system for mobile communication (GSM), Code Division Multiple Access (CDMA), Wideband CDMA, wireless local area network (WLAN), frequency division multiple access (FDMA), and the like.

Although the scope of the present invention is not limited in this respect, database 1125 may be connected to server 1130 for communicating with transmitter 1105 over network 1120. Network 1120 may be the Internet, or a public or private local area network (LAN), or a wide area network (WAN) operating according to any of several possible transport protocols, including the transmission control protocol/internet protocol (TCP/IP). Server 1130 may act as either a key server for delivering the appropriate key from database 1125 to wireless device processor 1190, or server 1130 may operate as an authentication server, having its own cipher unit for ciphering a random challenge or decoding a digital signature. Database 1125 may include any of several possible commercially available database management systems, or may be custom implemented, for example, by a regional carrier, strictly for antenna authentication purposes. Furthermore, database 1125 may be a centralized database for easy management and maintenance, in particular for easy update in the face of changing government regulations, if desired.

Although the scope of the present invention is not limited to this embodiment, serial number data for antenna models and associated gain range information may be stored in database 1125, and database 1125 may be configured to associate a unique key to potential gain range of available antenna to which transmitter 1105 might be attached. The serial number of antenna 1170 may be assigned by database 1125 to one of these gain ranges, based on antenna 1170's own gain. Finally, database 1125 may be pre-loaded with a set of keys corresponding to the types of antennas for which attachment may be anticipated. Authentication of antenna 1170 may proceed according to an antenna authentication method as described below.

Figure 10:
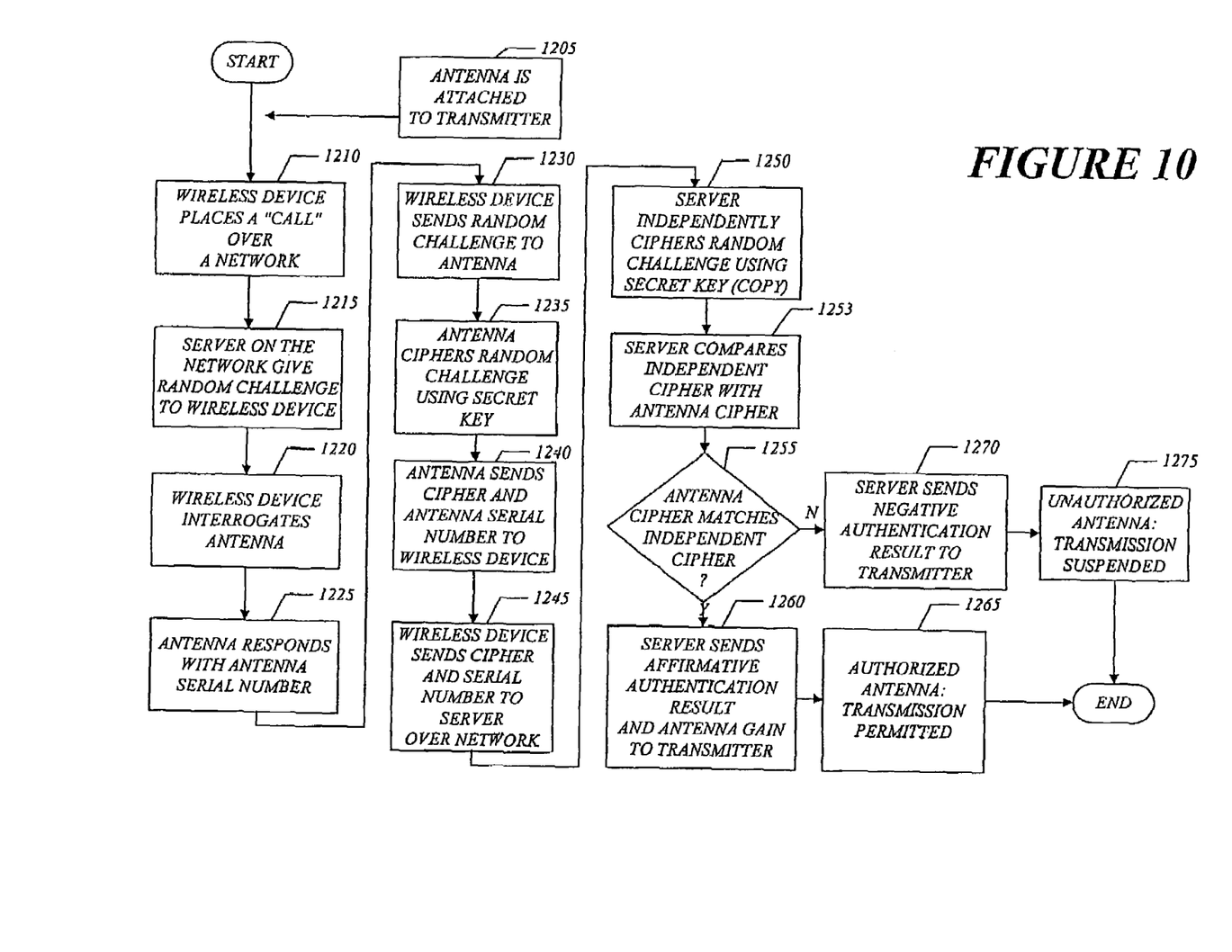
FIG. 10 is a schematic flowchart of a method of antenna authentication according to additional exemplary embodiments of the present invention.

FIG. 10 is a flow chart illustrating an exemplary operation of an embodiment of the external antenna authentication system of FIG. 9. The method may begin when an antenna 1170 may be attached to the transmitter 1105, as indicated at block 1205, at which point the transmitter 1105 may place a call over air interface 1115 to transceiver 1110, which may establish connectivity with network 1120 (block 1210). After connectivity with network 1120 has been established, the database server 1130 may send a random challenge to transmitter 1105, via transceiver 1110, over air interface 1115 (block 1215). As indicated at block 1220, transmitter 1105 may interrogate antenna 1170, and as indicated at block 1225, antenna 1170 may respond to the interrogation, e.g., by transferring the antenna serial number that may be pre-stored in memory chip 1140. AS indicated at block 1230, wireless device 1205 may send the random challenge to antenna 1170, and as indicated at block 1235, antenna 970 may cipher the challenge using antenna 1170's own secret key, if desired.

Although the scope of the present invention is not limited in this respect, as indicated at block 1240, antenna 1170 may send the cipher and antenna serial number to transmitter 1105 as indicated at block 1245, transmitter 1105 may send the cipher and serial number to transceiver 1110 over air interface 1115, which in turn may send the cipher and serial number to server 1130 over network 1120. In this embodiment, server 1130 may be equipped with a cipher unit, and may independently cipher the random challenge using a secret key copy, which may be obtained from a pre-loaded set of keys stored in database 1125. The server may estimate which key to use based on the serial number received during antenna interrogation (block 1225).

Although the scope of the present invention is not limited in this respect, as indicated at block 1253, server 1130 may act as an antenna authentication server. Server 1130 may compare the independently computed cipher computed by antenna 1170. As indicated at block 1255, server 1130 may determine if the independent cipher matches the antenna cipher. If a match is found, server 1130 may send an affirmative authentication result and the corresponding authorized antenna gain to transmitter 1105 (block 1260). At this point, antenna 1170 may be authenticated and conducted power may be allowed to pass, with the possibility of a modification of the transmitter's 1105 power level. If a match is not found, server 1130 may send a negative authentication result to wireless device 1105 (block 1270), antenna 1170 may be deemed unauthorized, and transmission of conducted power through the transmitter 1105 may be suspended (block 1275).

Although the scope of the present invention is not limited in this respect, in alternative embodiment of the present invention, the following operations may offload to processor 1290 of the wireless device. The offload operations may include: the independent cipher computation, the cipher comparison, and the authentication. In this respect, server 1130 may act as an on-line interface (e.g., key server) to key database 1125, while intelligent computational and authentication functions may be programmed into the wireless device's own processing circuitry 1190.

While certain features of the invention have been illustrated and described herein, many modifications, substitutions, changes, and equivalents will now occur to those skilled in the art. It is, therefore, to be understood that the appended claims are intended to cover all such modifications, substitutions, changes and equivalents as may fall within the true spirit of the invention.

What is claimed is:

1. A method of authorizing use of antenna circuitry having an antenna element coupled to a cipher unit, the method comprising: receiving from said antenna circuitry a cipher by said cipher unit based on a random challenge; authenticating the cipher; independently computing a second cipher; comparing said independently computed second cipher with the first cipher received from said antenna circuitry; authorizing a connection of said antenna circuitry to a transmitter if the second cipher is the same as the first cipher received from said antenna circuitry; and transmitting a signal via said antenna element.

2. The method of claim 1, comprising: wherein the antenna circuitry includes an antenna element and wherein the method further comprises:
   determining a an antenna characteristic of said antenna element based on the ciphered message; and
   controlling a power of a signal transmitted by said antenna element based on said determined antenna element characteristic.

3. The method of claim 2, wherein determining the antenna characteristic comprises:
   determining a gain of said antenna element and generating a gain code corresponding to said antenna element gain.

4. The method of claim 2, wherein controlling further comprises:
   sending said gain code; and
   suspending providing said power to said transmitted signal when no valid response received for the sending of said gain code and wherein, lack of said valid response indicates at least one of a fault condition and detached antenna.

5. The method of claim 2, comprising:
   suspending providing said power to said transmitted signal if said cipher is not authenticated.

6. The method of claim 1, further comprising decoding said cipher.

7. The method of claim 1, further comprising digitally signing an antenna serial number to produce said cipher.

8. The method of claim 1, further comprising: generating a ciphered message based on said first cipher.

9. The method of claim 1, further comprising suspending providing said power to said transmitted signal if said first cipher does not match said second cipher.

10. The method of claim 8, wherein generating said cipher comprises:
    generating said cipher by a hash; and
    computing said random challenge using a key.

11. The method of claim 10, wherein authenticating comprise:
    receiving a serial number from said antenna circuitry for selecting said key from a pre-stored set of keys.

12. The method of claim 10, wherein independently computing another cipher comprises computing said other cipher using a copy of said key.

13. A wireless communication device comprising: a transmitter having a processing circuitry to: receive from an antenna circuitry having an antenna element and a cipher unit a cipher provided by said cipher unit based on a random challenge; authenticate the cipher; independently compute a second cipher; and compare said independently computed second cipher with the first cipher and to authorize a connection of said antenna circuitry to said transmitter if the second cipher is the same as the first cipher.

14. The wireless communication device of claim 13 wherein said antenna circuitry has a determinable antenna characteristic, and wherein said transmitter further comprises:
   a processing circuitry able to receive a code corresponding to said antenna characteristic and to control a conducted power of said transmitter based on said code.

15. The wireless communication device of claim 14, wherein said determinable characteristic is a gain of said antenna element.

16. The wireless communication device of claim 15, wherein said antenna circuitry further comprises a memory chip for storing said code corresponding to said gain.

17. The wireless communication device of claim 15, wherein said processing circuitry is configured to suspend said conducted power when said code corresponds to a value of said gain that indicates a short circuit.

18. The wireless communication device of claim 15, wherein said processing circuitry is configured to suspend said conducted power when said code corresponds to a value of said gain that indicates an open circuit.

19. The wireless communication device of claim 16, wherein said memory chip of said antenna circuitry comprises said cipher unit, and wherein said processing circuitry is configured to authorize the attachment of said antenna circuitry based authentication of said cipher.

20. The wireless communication device of claim 19, wherein the antenna circuitry comprises a key and said cipher unit is configured to compute the first cipher based on said key.

21. The wireless communication device of claim 20, wherein said transmitter further comprises:
   a random number generator to generate a random challenge; and
   a copy key set to provide a copy of a key corresponding to said first cipher received from the antenna circuitry, wherein said processing circuitry is configured to compute an independent cipher based on the key copy.

22. The wireless communication device of claim 21, wherein said processing circuitry is configured to compare said first cipher to said independent computed cipher, and to suspend transmission of said transmitter if the independent cipher does not match the received cipher.

* * * * *